INVENTOR.
Clifford E. Chandler
BY
Atty.

Feb. 16, 1960   C. E. CHANDLER   2,925,151
MINE CAGE SAFETY DEVICE
Filed July 26, 1954   4 Sheets-Sheet 2

INVENTOR.
Clifford E. Chandler
BY
Atty.

INVENTOR.
Clifford E. Chandler

Feb. 16, 1960 — C. E. CHANDLER — 2,925,151
MINE CAGE SAFETY DEVICE
Filed July 26, 1954 — 4 Sheets-Sheet 4

INVENTOR.
Clifford E. Chandler
BY
Atty.

United States Patent Office 2,925,151
Patented Feb. 16, 1960

2,925,151

MINE CAGE SAFETY DEVICE

Clifford E. Chandler, Hayden Lake, Idaho

Application July 26, 1954, Serial No. 445,754

1 Claim. (Cl. 187—85)

The present invention relates to improvements in a mine cage safety device.

In present day mining operations, a crane suspended cage is utilized to carry men from the ground level to the working area many hundreds of feet below the earth's surface. This cage is merely suspended on the cable attached to the crane, and lowered into the shaft. The cage has guide shoes thereon which slide along vertical wooden guide members in the shaft to guide the cage smoothly down the shaft. However, should the supporting cable part, there would be no support for the cage, and it would drop to the bottom of the shaft, killing the passengers.

It is the principal purpose of my invention to provide a safety device on the cage which will operate to support the cage in the shaft if the supporting cable should break or become slack.

A further purpose of my invention is to provide such a device having means to stop the cage automatically in the event that the supporting cable should part or become slack. Manual operating means are also contemplated which may be manipulated by a passenger to stop the cage when desired.

My improved safety device comprises a pair of guide and brake shoes attached to the cage and in sliding engagement with the guide members in the shaft. Means on the cage are provided to force the shoes out against the guides with sufficient pressure to stop the cage upon removal of tension on the supporting cable which suspends the cage from the operating crane or winch. These means include brake levers adjacent the shoes and an hydraulic piston and cylinder adapted to operate the levers. The supporting cable is mounted on a spring loaded lever so that when the cable supports the weight of the cage, the spring is held in connection. When the tension is removed from the supportting cable, the spring is released and expands, causing the cable mounting lever to operate a valve connected to the hydraulic cylinder. When the valve is opened, air is admitted to the cylinder and its piston is forced down, operating the braking levers to force the shoes against the guide members in the shaft.

The nature and advantage of my invention will appear more fully from the following description and the accompanying drawings. The description and drawings are considered illustrative only, however, and are not intended to limit the invention except insofar as it is limited by the claim.

Figure 1:
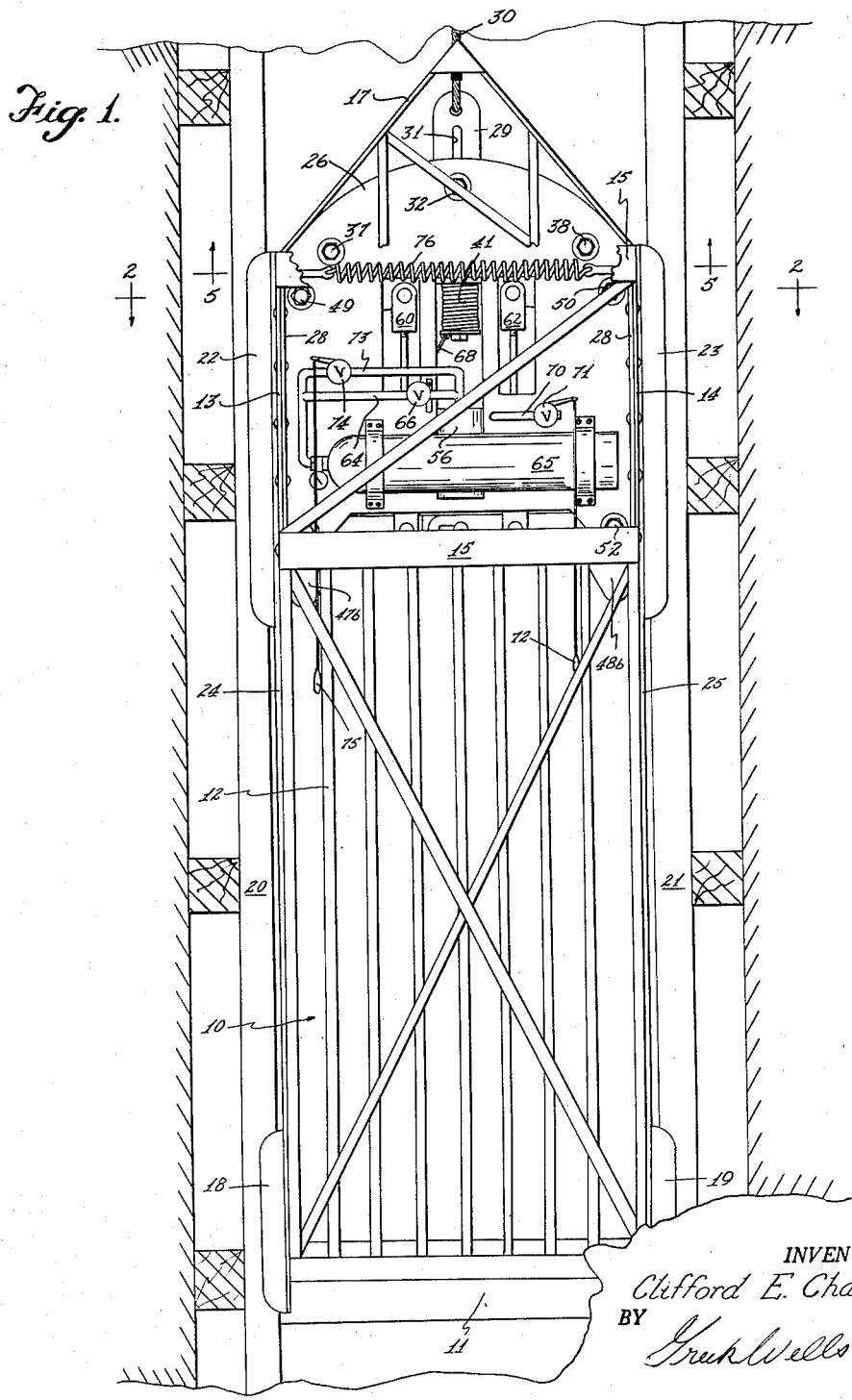
Figure 1 is a view in side elevation of a mine cage equipped with my improved device.
Figure 2:
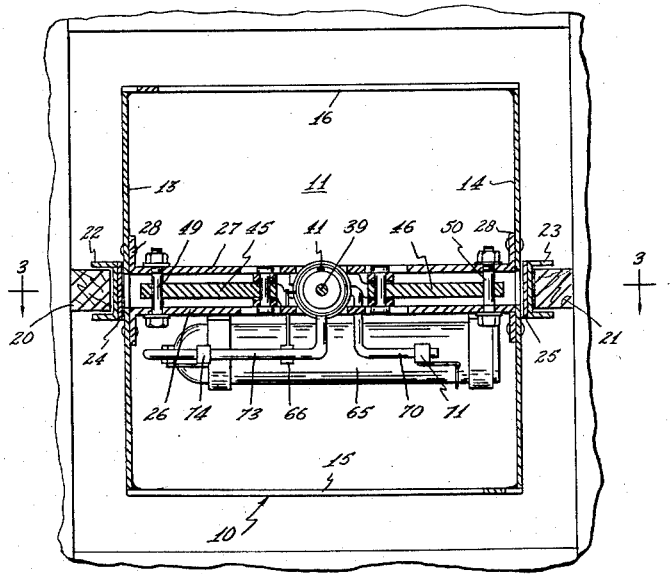
Figure 2 is a plan sectional view taken substantially on the line 2—2 of Figure 1.

Referring now to the drawings and to Figures 1 and 2 in particular, my improved safety device is shown as being used on a mine cage generally indicated by the numeral 10. The cage 10 has a passenger platform 11 which is enclosed on all sides by lattice sides 12. A door (not shown) is included in one side 12 to admit passengers to the cage 10. Above the passenger compartment by the platform 11 and the sides 12, a supporting frame is provided. The supporting frame comprises two side plates 13 and 14, which have end frames 15 and 16 attached thereto. The members 13, 14, 15 and 16 form a rectangular frame which supports the sides 12 and the platform 11. A sloped roof member 17 is attached to the plates 13 and 14 to protect the cage and its occupants from falling objects. Stationary guide shoes 18 and 19 are provided on the cage 10 at the lower edge to cooperate with wooden guides 20 and 21 positioned within the shaft to guide the cage smoothly up and down the shaft. Additional guide shoes 22 and 23 are provided on the cage 10 at its upper end. The guide shoes 22 and 23 are mounted on spring steel straps 24 and 25 which extend downwardly beside the cage 10 and are secured at the lower edge. With this construction, the upper shoes 22 and 23 may be moved outwardly against the guides 20 and 21 by bending the steel straps 24 and 25. The straps, however, normally hold the shoes 22 and 23 against the plates 13 and 14.

Figure 3:
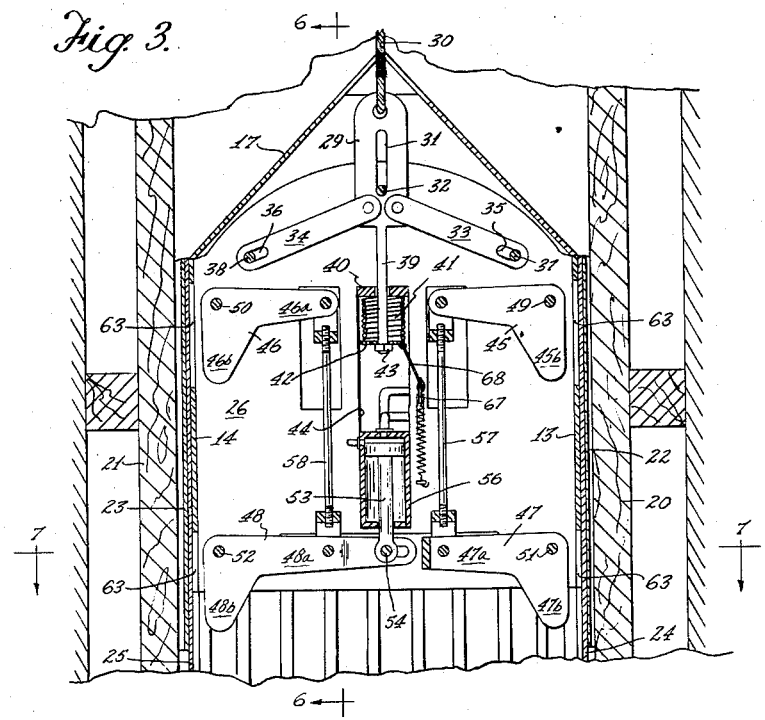
Figure 3 is a sectional view taken on the line 3—3 of Figure 2.

Two main supporting members 26 and 27 are mounted between the plates 13 and 14. The members 26 and 27 have vertical flanges 28 which are riveted to the plates 13 and 14 to secure the members 26 and 27 in place. A cable mounting lever 29 is positioned between the members 26 and 27 near their upper edges. The lever 29 mounts a supporting cable 30 which extends upwardly to a crane boom (not shown) to support the cage 10. The lever 29 has a vertical slot 31 therein which receives a bolt 32 fixed between the members 26 and 27. Links 33 and 34, also positioned between the members 26 and 27, are pivoted to the lever 29 and extend outwardly. The outer ends of the links 33 and 34 have slots 35 and 36 therein which receive bolts 37 and 38. The bolts 37 and 38, like the bolt 32, are fixed between the members 26 and 27. With the construction just described, the lever 29 is free to move up and down between the members 26 and 27 for the length of the slot 31. The slots 35 and 36 in the links 33 and 34 are so positioned that when the lever 29 is moved up until the bolt 32 rests in the bottom of the slot 31, the bolts 37 and 38 also rest in the outer ends of the slots 35 and 36. When the cage 10 is suspended by the cable 30, the lever 29 and links 33 and 34 are drawn up as just described, and as shown in Figure 3, so that the weight of the cage is carried by the bolts 32, 37 and 38.

At the lower edge of the lever 29, a vertical rod 39 is fixed. The rod 39 extends downwardly between the members 26 and 27 through a cross bar 40, which is secured between the members 26 and 27. A spring 41 is positioned around the rod 39 below the cross bar 40. A washer 42 and a nut 43 on the rod 39 secure the spring 41 in place. The spring 41 is so mounted that when the lever 29 is drawn up so that the bolt 32 rests in the bottom of the slot 31, the spring 41 is compressed. Then when tension is removed from the cable 30, the spring 41 expands and draws the lever downward. The supporting members 26 and 27 have apertures 44 therein adjacent the spring 41 to allow sufficient clearance for the spring 41 to operate freely. The cross bar 40 seats at the top of the apertures 44.

Figure 7:
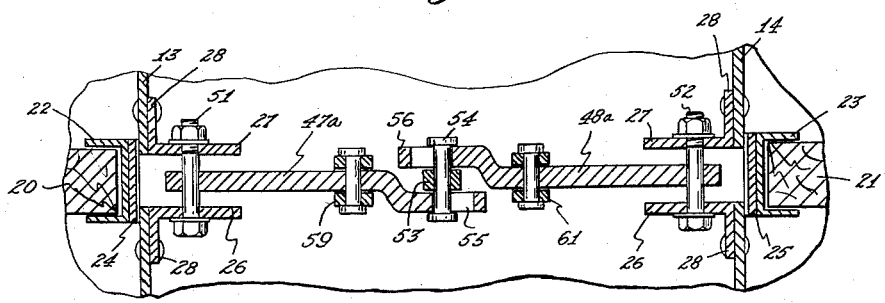
Figure 7 is an enlarged sectional view taken on the line 7—7 of Figure 3.

Also mounted between the supporting members 26 and 27 are four L-shaped braking levers 45, 46, 47 and 48. The braking levers 45 and 46 are positioned near the upper edges of members 26 and 27 and outwardly from the spring 41. The braking levers 47 and 48 are positioned near the lower edges of the members 26 and 27, the lever 47 being below the lever 45 and the lever 48 being below the lever 46. The levers 45 and 46 are pivotally suspended between the members 26 and 27 by pivot pins 49 and 50 as shown in Figures 2 and 3. The levers 45 and 46 have horizontal portions 45a and 46a which extend inwardly and have vertical portions 45b and 46b which depend from the pivots 49 and 50. The braking levers 47 and 48 are pivotally suspended between the members 26 and 27 by pivot pins 51 and 52 similar to the levers 45 and 46 and have like horizontal portions 47a and 48a and like vertical portions 47b and 48b. The free ends of the portions 47a and 48a overlap each other as best shown in Figure 7. The ends of the portions 47a and 48a are offset somewhat to each side so that there is a space between them. Positioned between the free ends of the portions 47a and 48a is a piston rod 53. A pin 54 extends through the rod 53 and through slots 55 and 56 formed in the offset ends of the portions 47a and 48a. The rod 53 connects to a piston 55 within an hydraulic cylinder 56 which is positioned between the members 26 and 27 above the levers 47 and 48.

Figure 4:
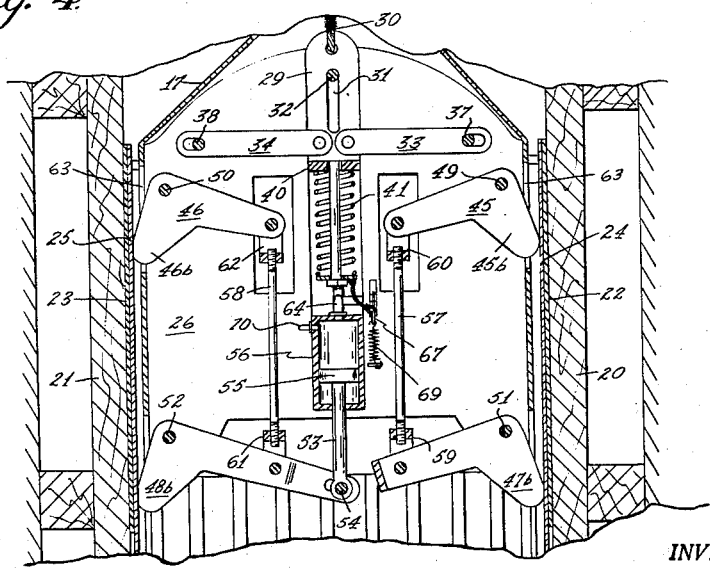
Figure 4 is a view similar to Figure 3, but showing the safety device in position to support the cage between the guide members.
Figure 6:
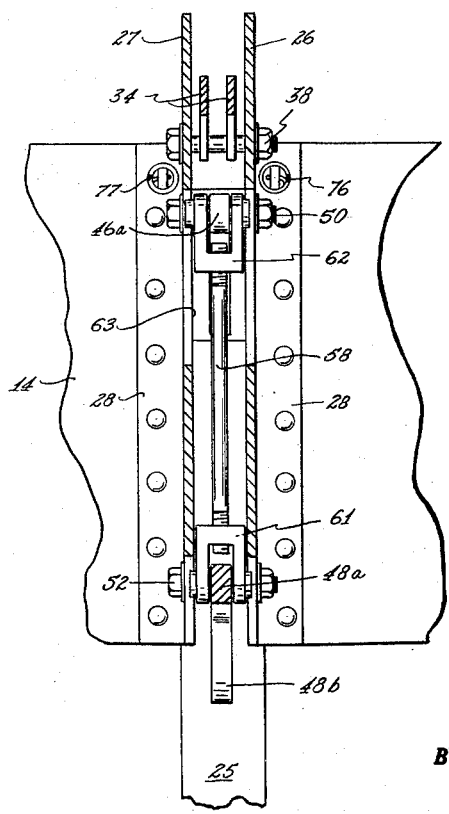
Figure 6 is an enlarged sectional view taken on the line 6—6 of Figure 3.

With the construction just described, the admittance of fluid under pressure to the hydraulic cylinder 56 will cause the piston 55 and piston rod 53 to be forced downward, thus moving the horizontal portions 47a and 48a of the braking levers 47 and 48 downward. This action, of course, pivots the levers 47 and 48 about the pins 51 and 52 and moves the depending portions 47b and 48b outwardly. In order to actuate the upper braking levers 45 and 46 in the same manner, tie rods 57 and 58, best shown in Figures 3, 4 and 6, are provided between the several levers 45, 46, 47 and 48. The tie rod 57 has yokes 59 and 60 at each end. The lower yoke 59 pivotally connects the tie rod to the horizontal portion 47a of the lever 47 intermediate the slot 55 and the pivot 51. The upper yoke 60 pivotally connects the tie rod 57 to the free end of the horizontal portion 45a of the lever 45. The tie rod 58 has a lower yoke 61 and an upper yoke 62 which connect it to the levers 46 and 48 in a similar manner. Thus, the downward movement of the portions 47a and 48a cause a downward movement of the portions 45a and 46a and cause the braking levers 45 and 46 to pivot and swing their vertical portion 45b and 46b outwardly. The side plates 13 and 14 have cut out portions 63 therein adjacent the levers 45, 46, 47 and 48 to allow the vertical portion 45a, 46a, 47b and 48b to pass through. Upon moving outwardly, the lever portions 45b and 47b contact the steel strap 24 supporting the shoe 22 and force it outwardly, pressing the shoe 22 against the guide 20. The lever portions 46b and 48b contact the strap 25 supporting the shoe 23 and force it outwardly, pressing the shoe 23 against the guide 21. Sufficient pressure is supplied to the cylinder 56 to apply enough friction force to the shoes 22 and 23 to stop the cage 10 and support it in the shaft. Figure 4 shows the mechanism in this position.

In order to supply fluid to the cylinder 56, an inlet pipe 64 is provided. The pipe 64 connects the cylinder 56 to a pressure tank 65 mounted on the supporting member 26. A pressure valve 66 is positioned in the pipe 64 to control the fluid flow. A control handle 67 is included on the valve 66 and extends inwardly through a slot in the member 26 to the space between the members 26 and 27. A flexible connector 68 is attached to the control handle 67 and connects it to the washer 43 which restrains the spring 41. The connector 68 is of such a length that when the spring 41 is compressed by the tension of the supporting cable 30, the connector 68 holds the valve handle 67 in the closed position. A spring 69 connected to the member 26 opposes the force of the connector 68, so that when the spring 41 expands due to removal of tension on the cable 30, the connector 68 is slackened as shown in Figure 3 and the spring 69 pulls the valve handle 68 down to the open position, thus admitting fluid to the cylinder 56.

An outlet pipe 70 also is connected to the cylinder 56, and has a pressure valve 71 thereon. The valve 71 is manually operated by a lever 72 which extends down into the passenger compartment of the cage 10. By manually operating the valve 71, the occupants of the cage 10 may relieve the pressure in the cylinder 56. Since there is a possibility of mechanical failure in the automatic valve opening mechanism made of the parts 66, 67, 68 and 69, a second inlet pipe 73 is included from the cylinder 56 to the tank 65. The pipe 73 bypasses the valve 67, that is, it is in parallel with the pipe 64. A valve 74 is included in the pipe 73 to control fluid flow therein. The valve 74 has a manual control handle 75 which extends into the passenger compartment. The valve 74 is spring loaded in the closed position, but by manipulating the handle 75, it may be opened to admit fluid to the cylinder 56. With this construction, occupants of the cage 10 may manually brake the cage 10 if the valve 66 fails to operate.

Figure 5:
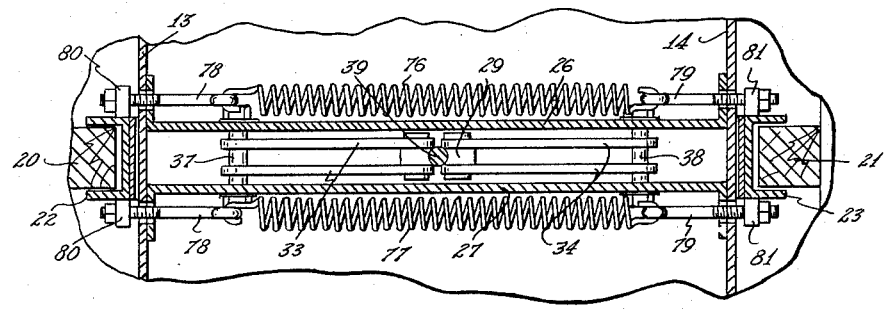
Figure 5 is an enlarged sectional view taken on the line 5—5 of Figure 1.

In order to insure that the shoes 22 and 23 are drawn away from the guides 20 and 21 when the safety device is not operating, springs 76 and 77 are provided, which hold the shoes back against the side plates 13 and 14. Figure 5 shows this construction best. The springs 76 and 77 are connected to bolts 78 and 79 which extend through enlarged apertures in the flanges 28 of the supports 26 and 27 and through apertures in the plates 13 and 14. The bolts 78 are fixed to ears 80 on the shoe 22 and the bolts 79 are fixed to ears 81 on the shoe 23. When the shoes 22 and 23 are forced outwardly, the springs 76 and 77 are tensioned. When the shoes 22 and 23 are released, the springs 76 and 77 return them to their normal position, and consequently force the levers 45, 46, 47 and 48 to their normal positions.

The operation of my invention is entirely automatic and is, therefore, particularly useful in mine cages of the present type. It is not necessary to depend upon quick thinking of the occupants to stop the cage if breakage should occur. At the instant the supporting cable cease to support the weight of the cage 10, the cable mounting lever 29 is forced downwardly by the spring 41. This action allows the valve 66 to open and admit fluid to the cylinder 56. Immediately the levers 45, 46, 47 and 48 operate to force the shoes 22 and 23 out against the guide members 20 and 21. Of course it is necessary that the pressure tank 65 be maintained at sufficient pressure to operate the device properly, so the tank must be checked frequently and replaced when the pressure drops below a specified value.

The paralleled emergency valve 74 and the exhaust valve 71 also perform a unique function. In the event of a cable break which leaves the cage suspended in the shaft, it is often desirable that the occupants leave the cage so that while a new cable is being attached, there is no danger to them. In the event that the cage is left suspended between levels, the occupants can manipulate the valves 71 and 74 to lower the cage to the nearest working level. By opening the exhaust valve 71 slightly, the pressure on the shoes 22 and 23 can be lessened just enough to cause the cage to slip slowly down the shaft. When a level is reached, the emergency valve 74 may be opened to stop the cage.

It is believed that the nature and advantages of my invention appear clearly from the foregoing description and the accompanying drawings.

Having thus described my invention, I claim:

In a mine shaft having parallel elevator guide members therein, an elevator cage, a cable supporting the elevator cage, a safety device for halting and supporting the cage in the shaft comprising a pair of guide shoes on the cage, said shoes being in sliding engagement with said guide members in the shaft, said cage including a supporting frame between the shoes, shoe supporting means fixed to the frame below the shoes and supporting the shoes for limited transverse movement, braking levers mounted on the frame adjacent the shoes, said braking levers operable to force the shoes outwardly against the guide members, an hydraulic cylinder mounted on the frame, a piston within the cylinder and having a rod extending therefrom, said rod being connected to the braking levers to move them against the shoes upon introduction of fluid to the cylinder, a reservoir tank containing fluid under pressure, said tank having a fluid pipe extending therefrom to the hydraulic cylinder, a control valve in the pipe, and means connecting the valve to the cable to open the valve upon removal of tension from the elevator supporting cable, said means comprising a cable mounting lever attached to the supporting cable, a slot in the lever, a bolt extending through the slot and being attached to the supporting frame, spring means on the lever opposing the force exerted by the supporting cable and operable to move the lever on the bolt upon removal of tension from the cable, and a valve operating member connected to the lever, said valve operating member holding the valve closed when tension is applied to the supporting cable and opening the valve when the mounting lever is moved by the spring means.

References Cited in the file of this patent

UNITED STATES PATENTS

| | | |
|---|---|---|
| 583,125 | Rossler | May 25, 1897 |
| 956,707 | Hyde | May 3, 1910 |
| 1,015,137 | Clark | Jan. 16, 1912 |
| 1,032,710 | Sivel | July 16, 1912 |
| 2,545,457 | Gammell | Mar. 20, 1951 |

FOREIGN PATENTS

| | | |
|---|---|---|
| 123,732 | Germany | Sept. 11, 1901 |